(12) United States Patent
Hubacek et al.

(10) Patent No.: US 8,500,090 B2
(45) Date of Patent: Aug. 6, 2013

(54) BALL VALVE SEALING RING

(75) Inventors: Miroslav Hubacek, Montgomery Center, VT (US); Luc Vernhes, Montreal (CA); Jocelyn Deslandes, Granby (CA)

(73) Assignee: Velan, Inc., Montreal, Quebec (CA)

( * ) Notice: Subject to any disclaimer, the term of this patent is extended or adjusted under 35 U.S.C. 154(b) by 0 days.

(21) Appl. No.: 12/730,928

(22) Filed: Mar. 24, 2010

(65) Prior Publication Data
US 2011/0233438 A1    Sep. 29, 2011

(30) Foreign Application Priority Data
Mar. 23, 2010 (CA) .................................... 2694864

(51) Int. Cl.
*F16K 5/06* (2006.01)

(52) U.S. Cl.
USPC ....... 251/171; 251/192; 251/315.01; 251/317

(58) Field of Classification Search
USPC .................... 251/171, 192, 315.01, 314, 316, 251/317
See application file for complete search history.

(56) References Cited

U.S. PATENT DOCUMENTS

| | | | |
|---|---|---|---|
| 2,647,002 A | 7/1953 | Brummer | |
| 2,943,838 A | 7/1960 | Skei | |
| 3,035,811 A | 5/1962 | Hamer | |
| 3,384,341 A | 5/1968 | Ripert | |
| 3,386,699 A * | 6/1968 | Petter et al. | 277/399 |
| 3,397,861 A * | 8/1968 | Scaramucci | 251/175 |
| 3,398,925 A | 8/1968 | Scaramucci | |
| 3,486,733 A | 12/1969 | Gordon, Jr. | |
| 3,554,484 A | 1/1971 | Gachot | |
| 3,576,309 A * | 4/1971 | Zawacki et al. | 251/174 |
| 3,610,575 A | 10/1971 | Yoneda | |
| 3,642,248 A * | 2/1972 | Benware | 251/172 |
| 3,918,681 A | 11/1975 | Eberhardt | |
| 4,023,773 A * | 5/1977 | Wise | 251/148 |
| 4,030,520 A | 6/1977 | Sands | |
| 4,061,307 A | 12/1977 | Yoshiike et al. | |
| 4,071,220 A | 1/1978 | Iino | |
| 4,113,231 A | 9/1978 | Halpine | |
| 4,157,170 A * | 6/1979 | McClurg | 251/315.01 |
| 4,266,752 A * | 5/1981 | Johnson | 251/173 |
| 4,345,738 A | 8/1982 | Ripert | |
| 4,385,747 A * | 5/1983 | Renaud et al. | 251/315.01 |

(Continued)

FOREIGN PATENT DOCUMENTS

GB                544732           4/1942

*Primary Examiner* — John Bastianelli

(74) *Attorney, Agent, or Firm* — Polster Lieder Woodruff & Lucchesi, L.C.

(57) ABSTRACT

A ball valve sealing ring is provided for sealing between a ball valve member a valve body. The sealing ring may comprise a ring body having a ball valve member-contacting surface and one or more valve body-contacting shoulders for contacting the valve seat. The sealing ring may comprise a resilient ring core for providing bending resistance. The resilient ring core may be at least partially conical and may have a curved cross-section with a convex side oriented towards the member-contacting surface. The cross section may be of a geometry corresponding to the outer contour of the ring body or shoulders and may have ends bent towards the member-contacting surface. The ring core may also have a plurality of apertures spaced about its circumference. The sealing ring may be elastically deflected upon contact with the valve member. Also provided is a ball valve seating arrangement comprising the aforementioned sealing ring.

19 Claims, 9 Drawing Sheets

U.S. PATENT DOCUMENTS

| | | | |
|---|---|---|---|
| 4,410,165 A | 10/1983 | Koch et al. | |
| 4,552,335 A * | 11/1985 | Alexander et al. | 251/315.05 |
| 5,069,240 A * | 12/1991 | Kurkjian, Jr. | 251/315.03 |
| 5,170,993 A | 12/1992 | Bonetti | |
| 5,746,417 A | 5/1998 | Bowers et al. | |
| 6,695,285 B1 | 2/2004 | Hotton et al. | |
| 6,948,699 B1 * | 9/2005 | Keiser | 251/315.1 |
| 7,377,482 B2 | 5/2008 | Cipolla et al. | |
| 2006/0131533 A1 * | 6/2006 | Oh | 251/315.01 |
| 2008/0128648 A1 * | 6/2008 | Thomas et al. | 251/315.01 |

* cited by examiner

BALL VALVE SEALING RING

FIELD OF THE INVENTION

The present invention relates generally to a sealing ring for a ball valve.

BACKGROUND OF THE INVENTION

A ball valve is a valve that opens and closes by rotation of a ball. The ball has a port therethrough such that when the port is in line with ends of the valve, flow will occur. The ball sits in, and is sealed by, valve seats.

As is well known, a main requirement in the manufacture of ball valves is that an effective seal be maintained between the valve seats and the ball at all times. Many and varied forms of annular seats have been devised for this purpose.

One ball valve seat arrangement is described in U.S. Pat. No. 3,384,341 to Ripert ("Ripert"). A main feature of that arrangement resides in the cross-sectional shape of the seats (or "sealing rings") that is formed to have a somewhat arcuate overall formation with a substantially concave outer surface and a substantially convex inner surface. When pressure is applied to the inner surface, by contact with the ball, it tends to flex inwardly and due to the concavity of the outer surface, the middle portion of the ring increases in circumference under tension. By way of background, the valve of Ripert will be described in further detail with reference to FIGS. 1 to 3 herein. With particular reference to FIG. 1 of Ripert, a portion of a typical ball valve construction is shown as comprising a two piece valve body 10, having a main portion 12 including a tapped bonnet portion 14 receiving a valve spindle 16. The main body 10 is recessed axially to provide a fluid inlet 18 and an enlargement 20 constituting a valve chamber 21. The outer end of the enlargement 20 is tapped to threadably receive the minor portion of the valve body 22, which is also recessed axially to provide a fluid inlet 24. The inner ends of the fluid inlets 18 and 24 are each provided with sealing ring accommodating grooves 30 into which is adapted to fit sealing ring 32. The terminal end 17 of the spindle 16 is shaped in rectangular form to fit loosely with a corresponding slot 33 and a ball 34. Rotation of the spindle 16 causes a corresponding rotation of the ball 34, which includes an axial recess 35, between open and closed positions relative to the fluid inlets 18 and 24 with the sealing rings 32 acting to maintain the seal between the outer spherical surface of the ball and opposed portions of the valve body surrounding the fluid passages. FIG. 2 shows a sealing ring in perspective and partially broken view of Ripert, in which concave outer surface 50 and convex surface 52 are identified. In operation, and assuming that the spacing between the opposed ring accommodating grooves 30 is such that a minimum deflection only of the sealing rings 32 as shown in FIG. 3 is necessary, the outer surface of the ball 34 (FIG. 1) bears against the apex 57 of the inner surface of the ring so that it is urged inwardly along the centre as indicated by the arrow A. The deflection of the ring 32 in the direction A, due to the concave outer surface 50, places the ring under tension causing it to bear against the ring accommodating groove 30 along the direction of the arrows B and C bringing the surfaces 51 and 54 more tightly against the groove surfaces 61 and 63. At the same time, a convex inner surface is altered, as indicated at D, conforming to the curvature of the ball 34. The preferred minimum deflection illustrated in FIG. 3 will give the desired maximum sealing effect with the minimum of friction contact with the ball 34 making for ease in valve adjustment but the same maximum sealing effect is obtained with a condition of maximum deflection of the sealing ring, as shown in FIG. 3, without seriously affecting the friction resistance by the contact of the sealing rings with the ball 34. In effect, any deflection of the sealing rings by the ball outer surface bearing on the inner surface 51 of the ring increases the circumference while placing the ring under tension giving the desired sealing effect in the directions B and C. In other words, when the ball 34 abuts the convex surface 52, it will stretch or expand the circumference of the convex surface 52 thus placing it under tension. The spacing of the concave surface 50 from the connecting surface or inclined surface wall 65 of the groove 30 allows the ring to be placed under tension on bearing of the surface 52 by the ball 34. The sealing ring may also be in an alternative form by having a smooth arcuated inner surface rather than a surface with an apex. The same principles of deflection apply.

Due to the temperature and load conditions under which the sealing ring (or "seat ring") is required to operate, deformation can be a substantial problem result in shortened lifespan. Several attempts have been made to engineer sealing rings which are resistant to deformation.

U.S. Pat. No. 3,486,733 to Gorden et al. ("Gordon") discloses, according to the abstract, a seat ring for ball valves where the seat ring includes a core made of a resilient material and encapsulated by a molded body. The molded body may be made of rubber, rigid material such as ceramic or graphite, or synthetic plastic materials. The resilient core proved in Gorden enables the seat ring to withstand higher load. In one embodiment, there are two sections of the encapsulated core: "section 30 is made of resilient material and acts as spring. Section 31 may be made of rigid, non-resilient material" (see col 3, lines 37-38). Finally, the Gorden patent states that "the metal core provides the principle bending resistance . . . [and] insures full recovery of the seat [ring] as a whole to its normal shape when pressure is relieved so that no permanent deformation occurs" (see col. 4, lines 44-45 and 52-54). The resilient cores disclosed by Gorden are generally T- or V-shaped.

U.S. Pat. No. 4,113,231 to Halpine ("Halpine") teaches, according to the abstract, a seat ring comprising flexible elastomeric material (see col. 2, line 46) such as a helical spring 46 which is wound of suitable steel spring wire and which is of a diameter and length such that it may be fitted into the circular cavity 48 of the seat ring and held in place by the shape of the ring (see col. 2, lines 59-62). When the assembly is fully assembled, there is sufficient pressure at the seal 50 against the ball surface 19 so that the spring is slightly distorted, thus providing an outward force against the surface 19, sufficient to provide sealing pressure against the fluid pressure (see col. 3, lines 4-8).

U.S. Pat. No. 4,071,220 to Iino ("Iino") teaches, according to the abstract, that a "seal member 15 includes an annular groove or recess 85 in which the expansively resilient member 18 is forcibly engaged. The expansively resilient member 18 is spirally wound around itself" (see col. 6, lines 29-32) and "the groove width of the annular groove 85 formed in the seal member 15 is slightly smaller than the spiral diameter of the member 18. Accordingly, the annular resilient member 18 is forcibly engaged into the annular groove 85 [such that member 18] has its cross-section slightly flattened to a somewhat non-circular cross-sectional configuration (see col. 6, lines 48-55). The pressure required to contact body 14 with seal member 15 is provided by the annular expansive resilient member 18, which also compensates for damage and deformation of the seal member 15 as it is worn down (see col. 7, line 50 to col. 8, line 15).

Springs, including coiled springs (or helical springs) disclosed in the Halpine and lino patents suffer from known problems over time, including degradation, loss of tempering, and sagging.

SUMMARY OF THE INVENTION

It is an object to obviate or mitigate at least one disadvantage of previous designs.

In one aspect, a ball valve sealing ring is provided having a resilient core.

In one embodiment, there is provided a ball valve sealing ring for sealing between a ball valve body and a ball valve member, the sealing ring comprising: a ring body having a valve member-contacting surface for contacting the ball valve member and at least one valve body-contacting shoulder for contacting the valve body; and a resilient ring core disposed within the ring body and being of greater resilience than the ring body, the resilient ring core for providing bending resistance and having a curved cross-section whose convex side is oriented towards the valve member-contacting surface.

In another embodiment, there is provided a ball valve sealing ring for sealing between a ball valve body and a ball valve member, the sealing ring comprising: a ring body having a valve member-contacting surface for contacting the ball valve member, at least two valve body-contacting shoulders for contacting the valve body having an outer surface disposed therebetween; and a resilient ring core disposed within the ring body and being of greater resilience than the ring body, the resilient ring core for providing bending resistance and being substantially U-shaped, having ends angled towards the valve member-contacting surface and following a contour defined by the outer surface and the two valve-contacting shoulders.

In another aspect, a ball valve seating arrangement is provided comprising the aforementioned sealing ring.

Other aspects and features will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

A ball valve sealing ring is provided for sealing between a ball valve member a valve body. In one embodiment, the sealing ring may comprise a ring body having a ball valve member-contacting surface and one or more valve body-contacting shoulders for contacting the valve seat. The sealing ring may comprise a resilient ring core for providing bending resistance. The resilient ring core may be at least partially conical and may have a curved cross-section with a convex side oriented towards the member-contacting surface. The cross section may be of a geometry corresponding to the outer contour of the ring body or shoulders and may have ends bent towards the member-contacting surface. The ring core may also have a plurality of apertures spaced about its circumference. The sealing ring may be elastically deflected upon contact with the valve member. Also provided is a ball valve seating arrangement comprising the aforementioned sealing ring. In some embodiments, there is provided a ball valve sealing ring for sealing between a ball valve body and a ball valve member, the sealing ring comprising: a ring body having a valve member-contacting surface for contacting the ball valve member and at least one valve body-contacting shoulder for contacting the valve body; and a resilient ring core disposed within the ring body and being of greater resilience than the ring body, the resilient ring core for providing bending resistance and having a curved cross-section whose convex side is oriented towards the valve member-contacting surface.

Figure 1:
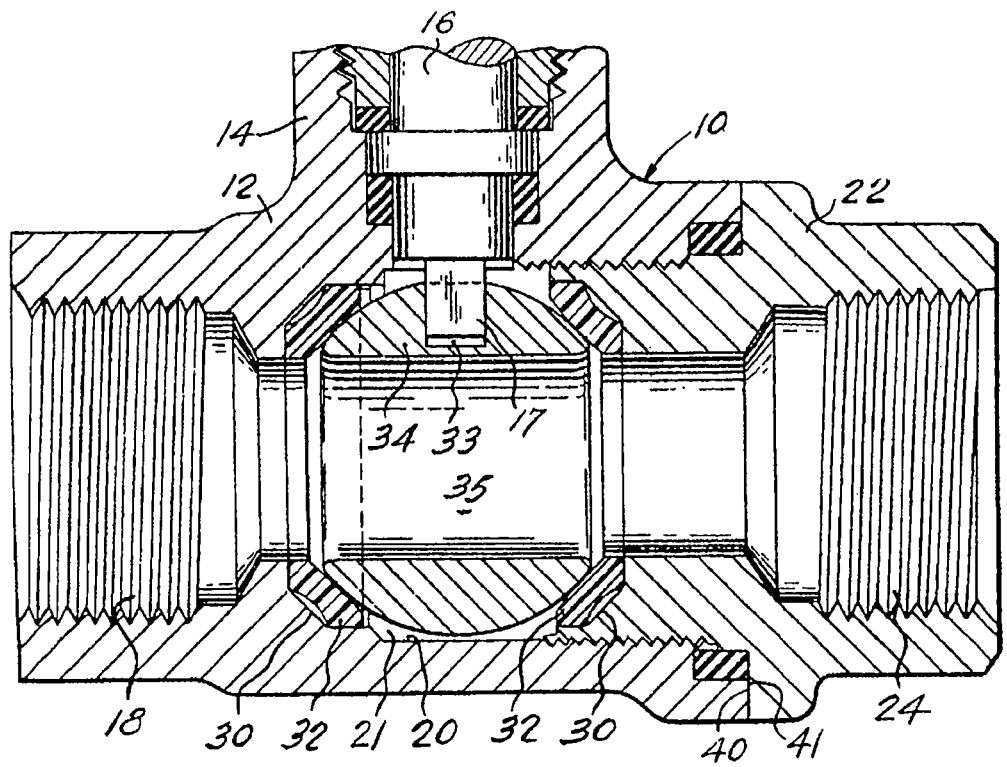
FIG. 1 is a vertical cross-sectional view of a ball valve construction with sealing rings, of U.S. Pat. No. 3,384,341 ("Ripert")
Figure 2:
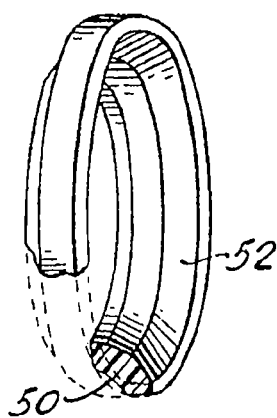
FIG. 2 is a perspective elevation and partially broken view of a sealing ring of U.S. Pat. No. 3,384,341 ("Ripert")
Figure 3:
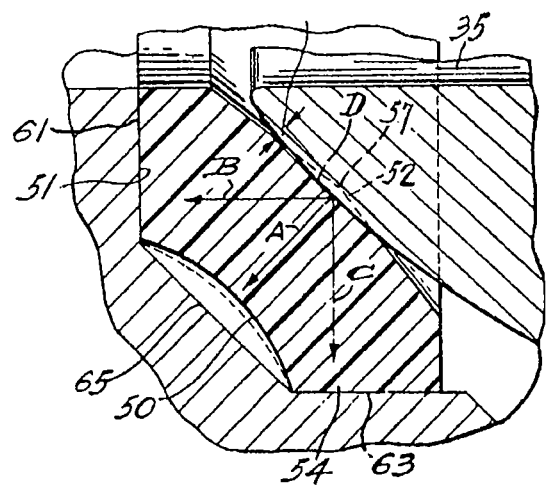
FIG. 3 is a greatly enlarged, somewhat diagrammatic view, partially in cross-section, of a portion of a valve body ring accommodating recess surrounding a valve seat, a cross-section of a sealing ring as shown in FIG. 2, and a portion of a ball to illustrate the action of the seal in sealing contact under minimum deflection as would occur with preferred tolerance conditions between opposed valve seats, all of U.S. Pat. No. 3,384,341 ("Ripert")
Figure 4A:
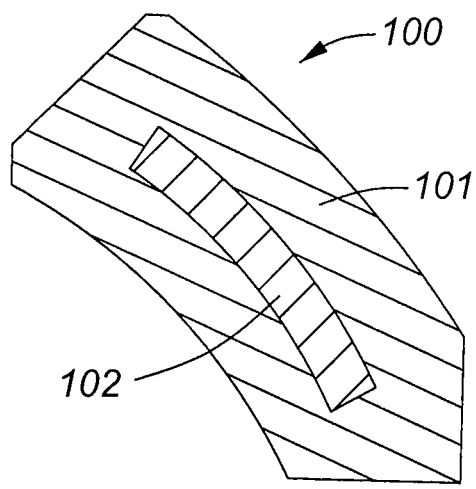
FIG. 4A is a cross-sectional view of a ball valve sealing ring in accordance with a disclosed embodiment.

Referring now to the Figures, FIG. 4A is a cross-sectional view of a resilient ball valve sealing ring 100 encompassed by one embodiment comprising ring body 101 and an resilient ring core 102 which may be a substantially circular band having a curved cross-section. "Resilient", as used herein, refers to a tendency to return to an original shape. In some embodiments, the sealing ring may have a first circumference which is greater than a second circumference resulting in a substantially conical or partial conical shape. In some embodiments, the resilient ring core 102 may also be a substantially conical or partially conical band. The resilient ring core may be formed from a Belleville washer and may have a curved surface. In some embodiments, the ball valve member-contacting surface may be substantially convex. The member-contacting surface may comprise an apex for contacting a ball valve member.

Computer simulation testing has shown that a sealing ring with a resilient ring core of the general shape depicted in FIG. 4A outperformed a sealing ring lacking a resilient ring core (but otherwise identical). For example, the sealing ring depicted in FIG. 4A may exhibit diminished internal stress compared to the core-free ring and may exhibit less creep (deformation over time).

Figure 4B:
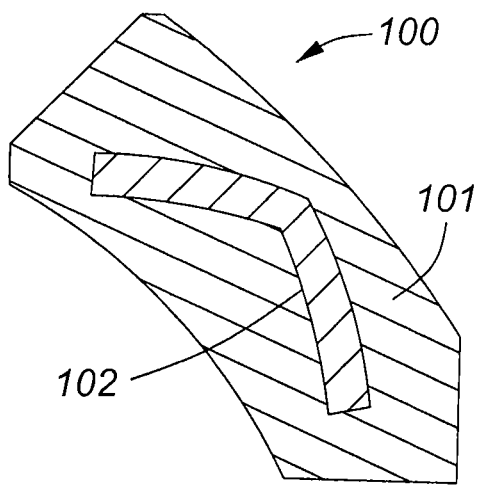
FIG. 4B is a cross-sectional view of a ball valve sealing ring in accordance with another disclosed embodiment.
Figure 4C:
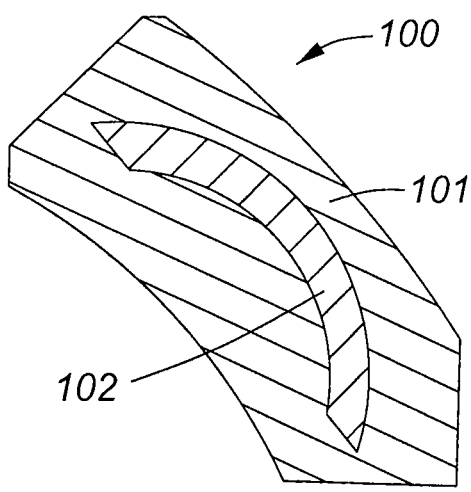
FIG. 4C is a cross-sectional view of a ball valve sealing ring in accordance with another disclosed embodiment.
Figure 4D:
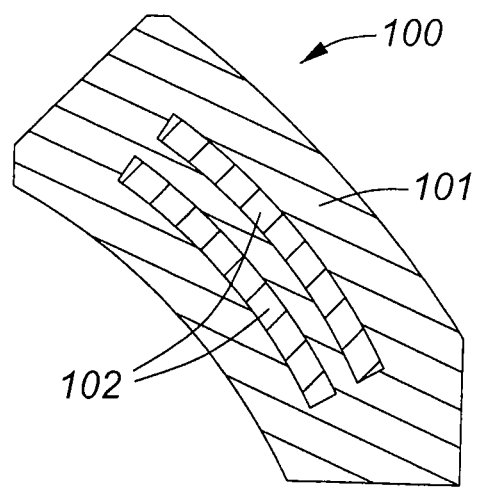
FIG. 4D is a cross-sectional view of a ball valve sealing ring in accordance with another disclosed embodiment.

FIGS. 4B, 4C, 4D, and are cross-sectional views of resilient ball valve sealing rings according to other embodiments of the invention. As may be seen, the resilient ring core 102 may have a curved cross section comprising other shapes, including, but not limited to, a pointed arch (FIG. 4B), or a curve of a different arc (FIG. 4C). A skilled person would readily appreciate that resilient ring cores with other types of curved cross-sections may be used and are contemplated herein. The ring may also comprise a plurality of resilient ring cores as exemplified in FIG. 4D.

In certain embodiments, the sealing ring may comprise at least one valve body-contacting shoulder. In some embodiments, it may comprise at least two valve body-contacting shoulders disposed between the valve member-contacting surface and an outer surface. In some embodiments, the valve-member contacting surface may be convex and/or the outer surface may be concave. In some embodiments, the valve-member contacting surface and the outer surface may have similar cross-sectional curvatures. In certain embodiments, outer body 101 may have a substantially pentagonal cross-sectional shape. In some embodiments, the resilient ring core 102 and the ring body 101 may have substantially similar cross-sectional curvatures (see, for example, FIGS. 4A and 4D).

In some embodiments, the ring body 101 may also be resilient. In some embodiments, the resilient ring core 102 may have a greater resilience than the outer body 101.

Figure 4E:
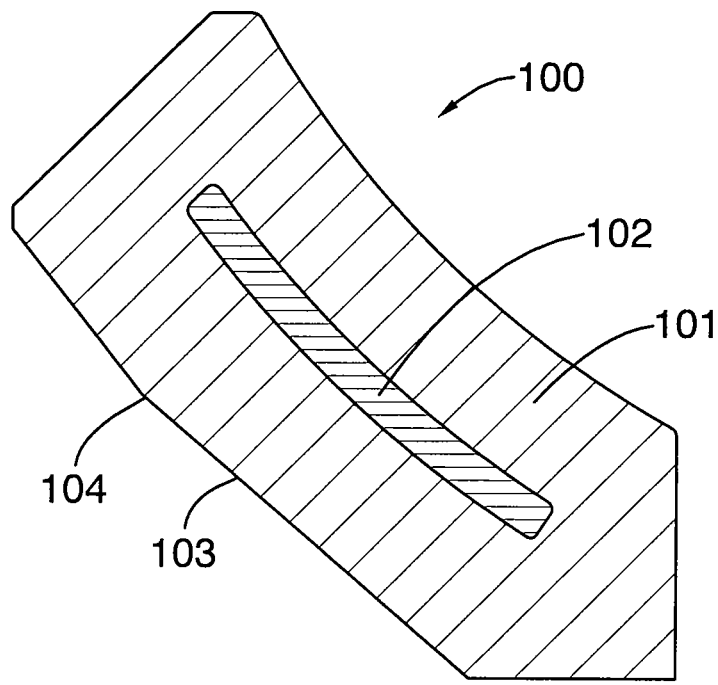
FIG. 4E is a cross-sectional view of a ball valve sealing ring in accordance with another disclosed embodiment.

In some embodiments, the cross-sectional thickness of the resilient core 102 may be varied (see core 102 in FIG. 4E compared to core 102 FIG. 4A, for example). A skilled person would appreciate that the optimal core thickness would depend upon materials and the intended application of the sealing ring.

As may be seen in FIG. 4E, the sealing ring 100 may comprise a ball valve member-contacting surface 103 with an apex which may comprise a point 104 for contacting the ball valve member.

Figure 4F:
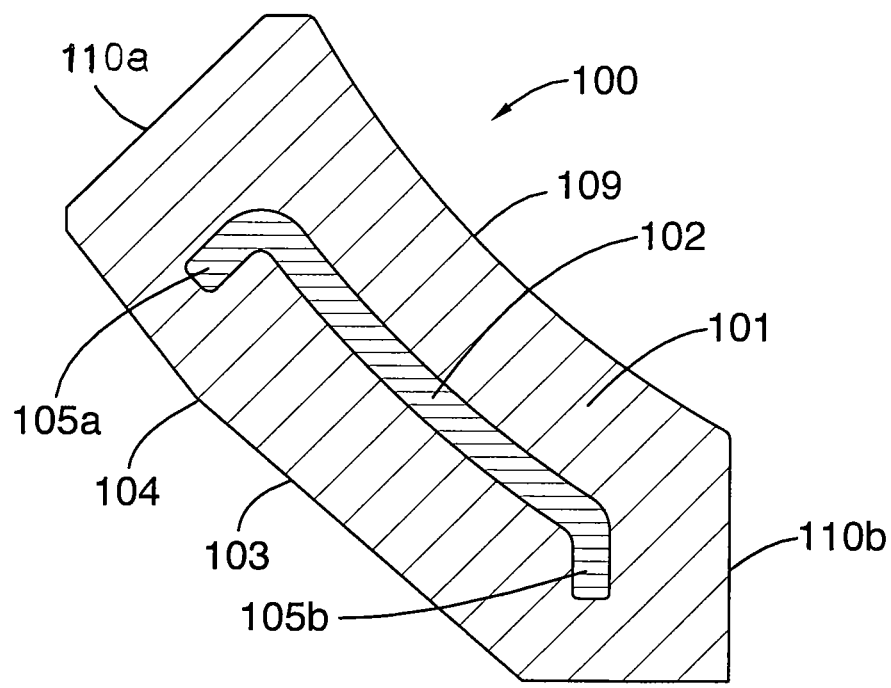
FIG. 4F is a cross-sectional view of a ball valve sealing ring in accordance with another disclosed embodiment.

As may be seen in FIG. 4F, the cross section of the resilient core may comprise ends 105a, 105b which may be angled towards ball valve member-contacting surface 103. The cross-sectional geometry of the resilient core 102 with angled ends 105a, 105b may correspond to the general contour defined by outer surface 109 and/or valve body-contacting shoulders 110a, 110b. The cross-sectional geometry may correspond to the cross-sectional shape of the groove in the ball valve body which receives the ring. In some embodiments, at least one end 105a may be substantially perpendicular to the valve member-contacting surface 103. The end 105a which is substantially perpendicular to the valve member-contacting surface may be the end which is positioned closest to the channel opening of the ball valve member. End 105b may be bent at an angle of 0 to 90 degrees with respect to the central portion of the cross section of the core 102. In different embodiments, it may be bent by an angle of about 15 to 75 degrees, 25 to 65 degrees, 35 to 55 degrees, or about 45 degrees.

Simulation indicated that a sealing ring comprising resilient core with angled ends 105a and 105b as depicted in FIG. 4F had reduced concentrations of internal stress. As such, this configuration may exhibit less creep.

Figure 4G:
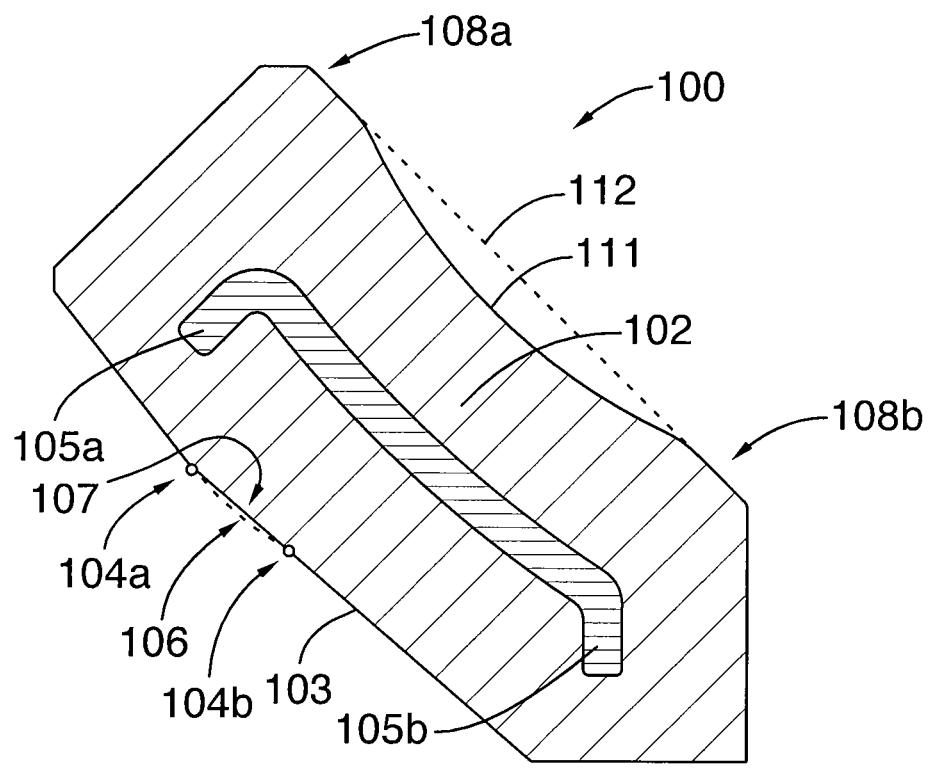
FIG. 4G is a cross-sectional view of a ball valve sealing ring in accordance with another disclosed embodiment.
Figure 9A:
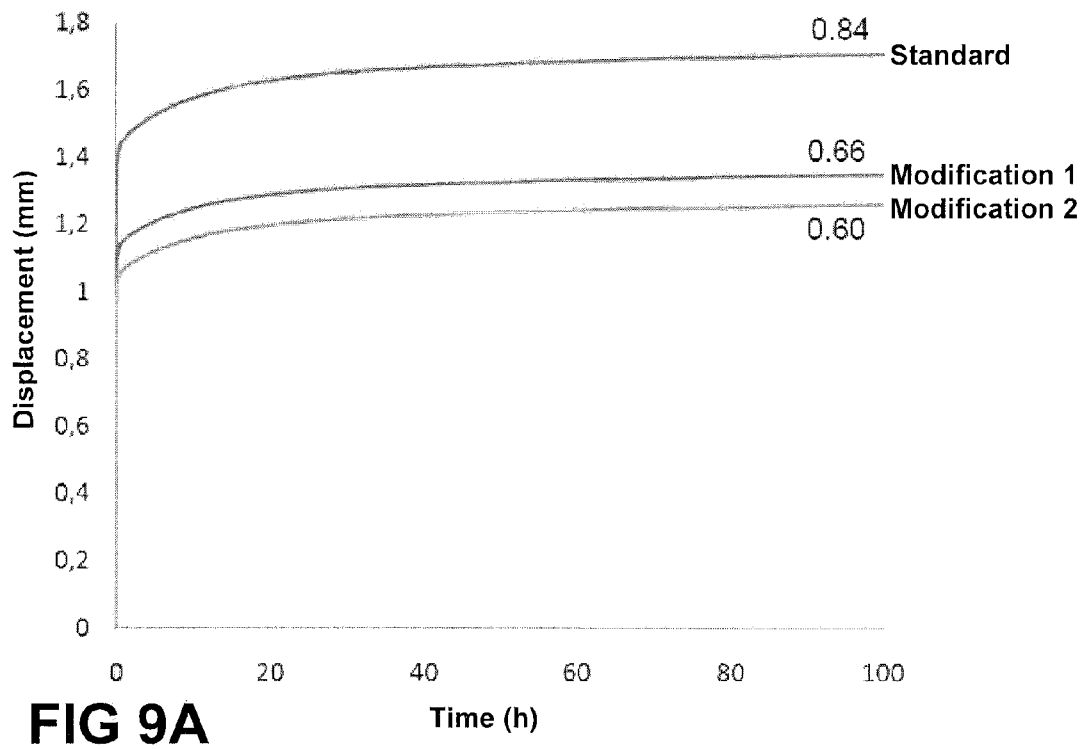
FIG. 9A shows a graph depicting the results of simulation deformation of rings according to certain embodiments compared to a standard.

Referring to FIG. 4G which depicts one embodiment, ball valve member-contacting surface may comprise two points 104a and 104b flanking a substantially flat surface 107 disposed therebetween (curved surface 106 is depicted in ghost for reference) for contacting the valve member. The outer surface may comprise a concave portion 111 disposed between two flat regions 108a and 108b (flat surface 112 is depicted in ghost for reference). Simulation was carried out to measure initial displacement and displacement over time (i.e. creep) for rings with these modifications upon engagement with a load of 12 MPa over 100 hours. These simulations (results in FIG. 9A) indicated that a ring which comprised concave portion 111 disposed between flat regions 108a and 108b exhibited less displacement (0.66 mm after 100 hours; see "Modification 1" data in FIG. 9A) compared to a standard ring having a flat valve body-contacting surface 112 (0.84 mm after 100 hours; see "Standard" in FIG. 9A). A ring with the aforementioned concave valve body-contacting surface modification which further comprised a ball valve member-contacting surface having two points 104a and 104b and flat surface 107 disposed therebetween displayed even less displacement (0.60 mm after 100 hours; see "Modification 2" data in FIG. 9A; depicted in FIG. 4G) compared to the standard (which did not have flat member-contacting surface 107). For both Modification 1 and Modification 2, both initial displacement and displacement over time were decreased compared to the standard.

Figure 5A:
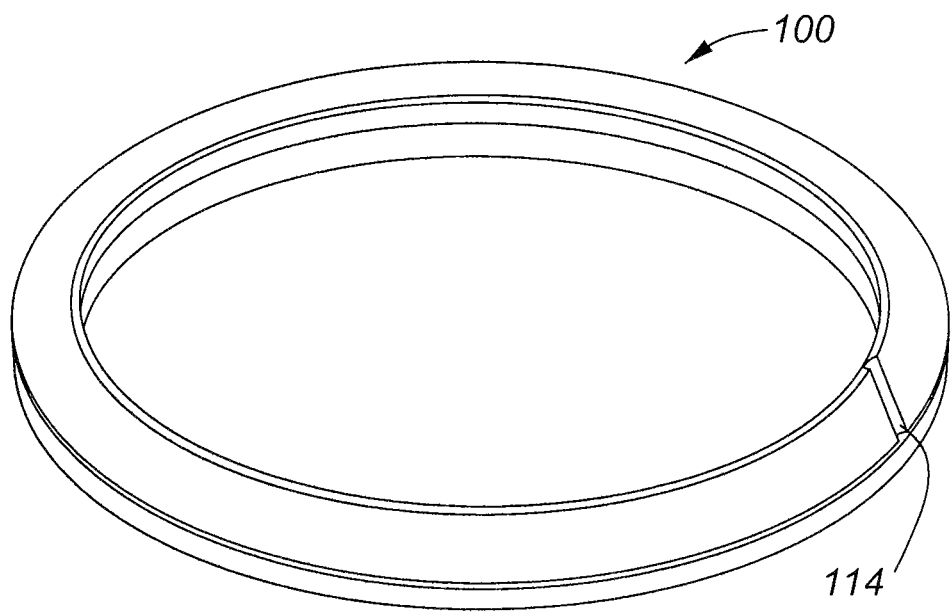
FIG. 5A is a perspective view of a ball valve sealing ring in accordance with a disclosed embodiment.
Figure 5B:
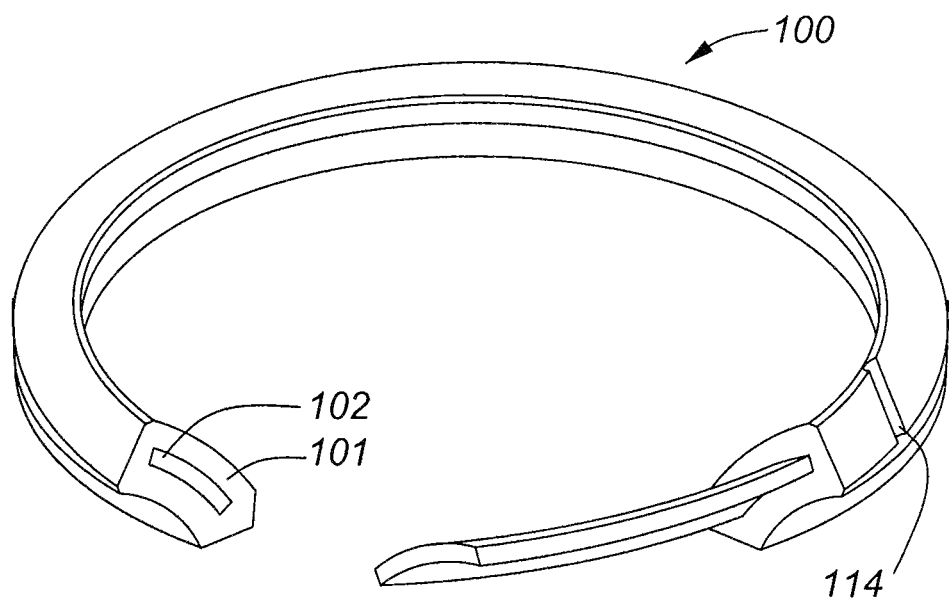
FIG. 5B is a perspective view of a partial cutaway of a ball valve sealing ring in accordance with a disclosed embodiment.

FIG. 5A is a perspective view of a resilient ball valve sealing ring 100 with ring body 101. In some embodiments, the sealing ring may comprise on or more relief grooves 114 to limit or prevent pressure build-up in the valve cavity. FIG. 5B is a perspective view of a partial cutaway of a resilient ball valve sealing ring 100 with an outer body 101 and an embedded resilient ring core 102 comprising a circular band having a curved cross-section according to one embodiment. As may be seen in FIG. 5B, the expression "cross-section", as used herein in reference to the curved cross-section of the resilient ring core, refers to a cross-section of the circular band taken across any plane parallel to the longitudinal axis defined by the ring.

Figure 8:
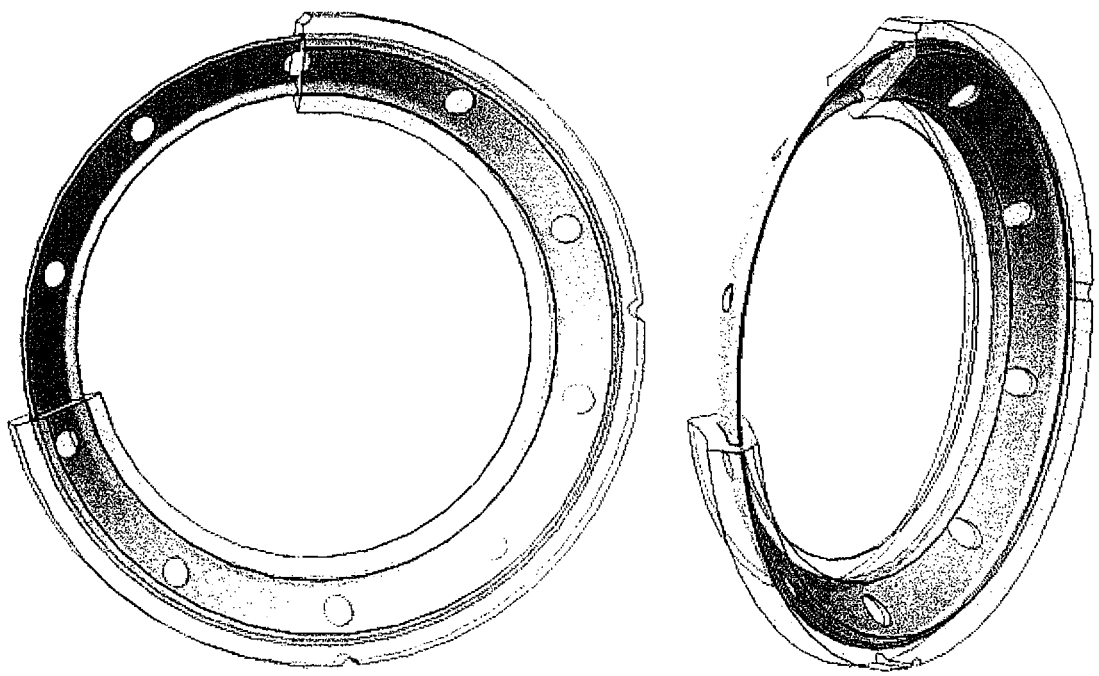
FIG. 8 depicts a plan view and a perspective view of a sealing ring, in partial cutaway, according to certain embodiments.

As exemplified in FIG. 8, in some embodiments, the resilient core may define a plurality of apertures extending through its surface. In some embodiments, these apertures may be substantially circular. In some embodiments, the apertures may be spaced apart evenly. The ring body may extend through these apertures in certain embodiments and this may improve performance of the ring by helping to maintain cohesion between the ring body and the resilient core and/or by preventing movement between the ring body and resilient core.

In another aspect, there is provided ball valve seating arrangement comprising one or more sealing rings as described above.

In some embodiments, the seating arrangement may comprise one or more sealing rings as described above, a ball valve member, and a ball valve body comprising one or more ring-accommodating grooves or recesses for receiving one or more sealing rings.

Figure 7:
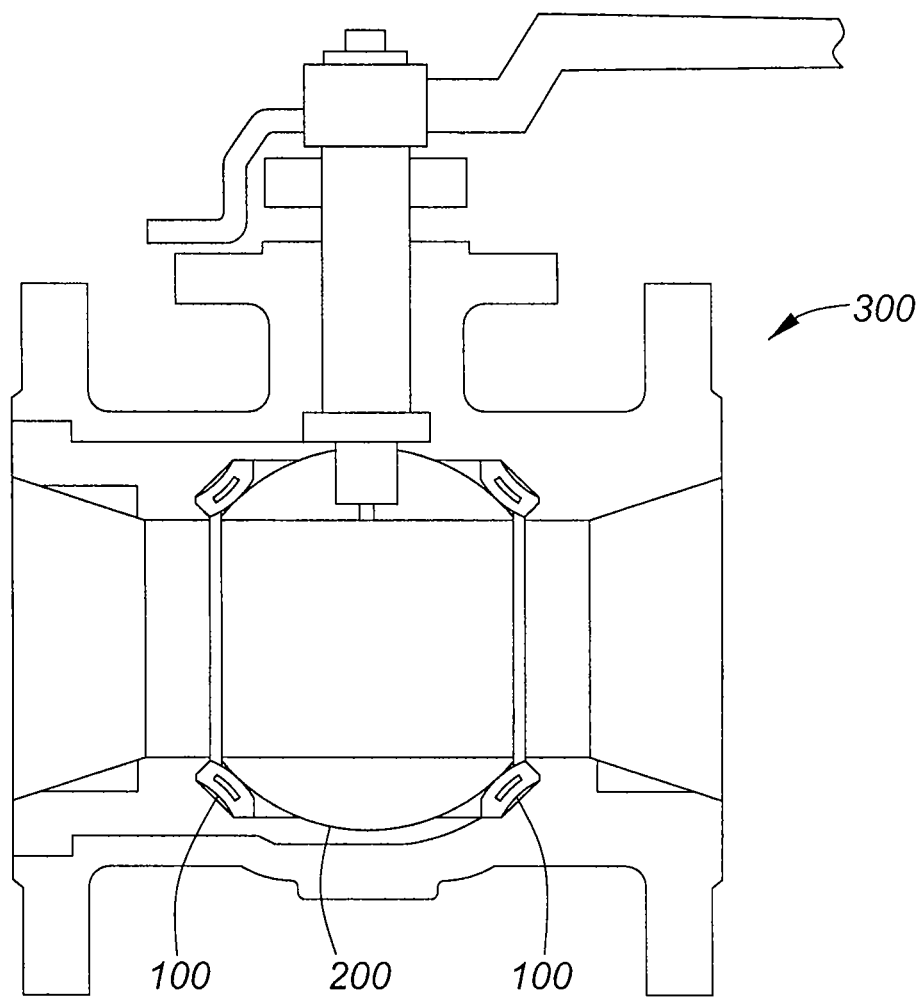
FIG. 7 is a cross-sectional view of a ball valve seating arrangement in accordance with one embodiment.

An example of a general arrangement, according to one embodiment, is depicted, by way of example only, in FIG. 7 in which arrangement 300 comprises ball valve member 200 and sealing rings 100. A skilled person would appreciate that sealing rings according to various embodiments could be selected according to, for example, size, thickness, etc. for use in a wide variety of seating arrangements. The sealing ring is envisaged to engage a ball valve. The ring body comprises a valve member-contacting surface for sealably contacting a ball valve member. In certain embodiments, the resilient ring core has a curved cross-section with a convex side oriented towards the valve member-contacting surface of the outer body which contacts the ball valve member.

Figure 6A:
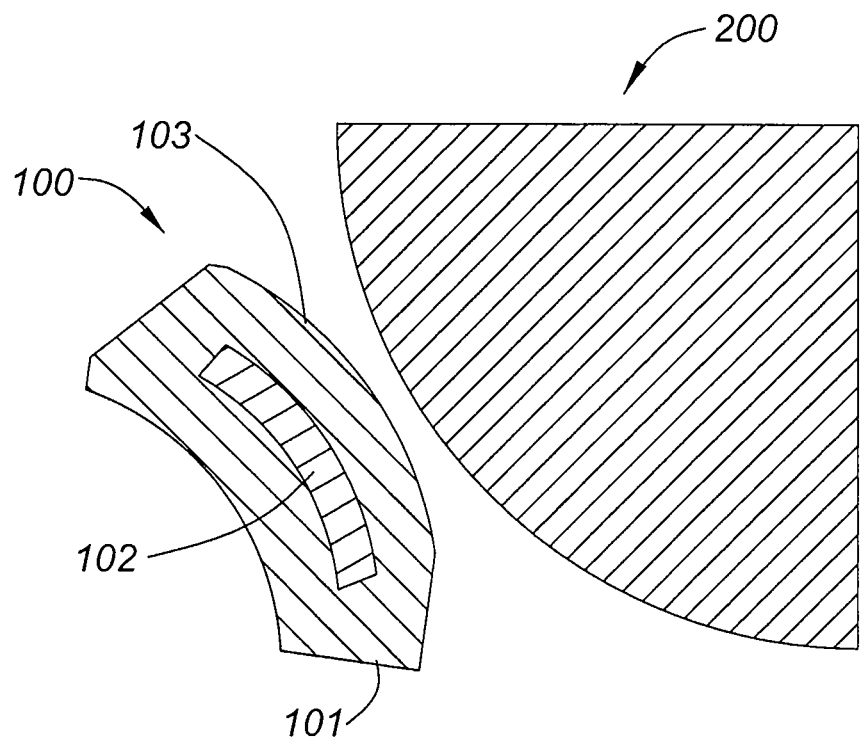
FIG. 6A is a cross-sectional view of a ball valve sealing ring and a ball valve in accordance with a disclosed embodiment.
Figure 6B:
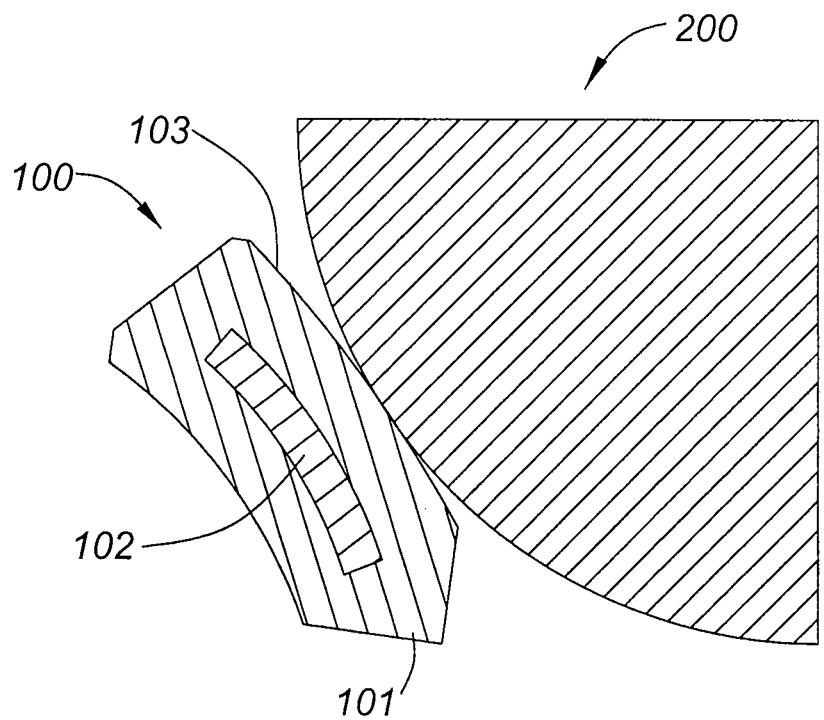
FIG. 6B is a cross-sectional view of a ball valve sealing ring engaging a ball valve in accordance with a disclosed embodiment.

In some embodiments, the sealing ring may be elastically deflected, for example, away from the ball valve member. FIG. 6A depicts a cross-sectional view of partial ball valve and sealing ring prior to engagement. FIG. 6B depicts a cross-sectional view showing deflection of the sealing ring upon engagement with the ball valve. As may be seen, the convex surface of resilient ring core 102 may be oriented towards the point of contact between the ball valve member-contacting surface 103 of the outer body 101 and the ball valve member 200. In a further embodiment, the apex of the convex surface of the resilient ring core may be the closest point to the ball valve member 200. In some embodiments, the orientation of the curved cross-section with respect to the ball valve helps the sealing ring to optimally absorb, bear or distribute the load or pressure exerted by the ball valve member 200.

In some embodiments, the outer body may be elastically deflected upon engagement with the ball valve. The resilient ring core may be deflected upon engagement with the ball valve. The deflection of the ring core may be less than the deflection of the valve member-contacting surface. In some embodiments, upon engagement with the ball valve member, the convex valve member-contacting surface may be deflected to substantially conform to the curvature of the ball valve member. In some embodiments, the elastic deflection of the sealing ring and/or resilient ring core places the sealing ring and/or resilient ring core under tension, causing the ring to bear against a the valve body or a ring accommodating groove of said valve body. The deflection of the sealing ring and/or resilient ring core through contact of the sealing ring with the ball valve may increase the circumference of the sealing ring which may provide a more effective seal with the valve body or a ring accommodating groove. In some embodiments, deflection of the sealing ring and/or resilient core may force the shoulders into better contact with the valve body or valve-accommodation groove.

In some embodiments, the seal may be maintained without permanent deformation. In some embodiments, the seal may be maintained with less permanent deformation and less compression of the ring. This may help to maintain a tight fit between the ball valve member and the sealing ring and/or the sealing ring and the valve body.

In certain embodiments, the resilient ring core may help the ring to resist sagging, loss of resilience, volume loss due to wear, or thermal expansion over its lifetime. In certain embodiments, using the above-described sealing ring(s) in the seating arrangement may help to limit or prevent undesirable deformation, degradation or wear, for example, over time, including but not limited to any deformation that negatively impacts the functioning or lifespan of the sealing ring or ball valve. This may include, for example, long-term deformation including, for example, cold-flow, creep or sagging, volume losses due to wear, or thermal expansion. In some embodiments, the aforementioned sealing ring may result in an increase in the usable lifespan of the sealing ring or ball valve.

The resilient ring core may be formed, for example and without limitation, of stainless steel (for example, 17-4PH or 17-5PH), a super alloy (for example, Inconel™ or Hastelloy™) or a polymer (for example, a polyimide-based polymer such as, for example, Vespel™, or a polyether ether ketone such as, for example, PEEK™).

Figure 9B:
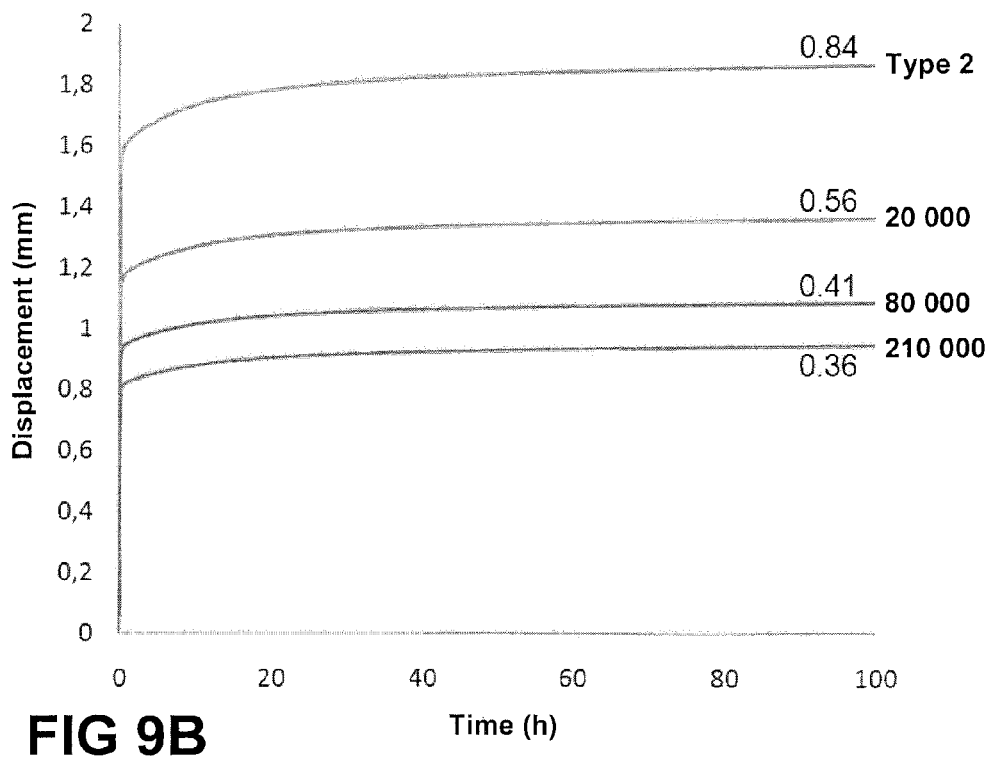
FIG. 9B depicts the results of simulation deformation of rings according to certain embodiments compared to a standard.

Simulation of sealing rings, according to some embodiments, has demonstrated a relationship between resilience of the ring core and reduction of both initial deformation and creep. Results are depicted in FIG. 9B. Compared to a ring composed entirely of TFM (tetrafluoro methoxyl polymer; see 'Type 2' in FIG. 9B) there was a incremental reduction in both initial deformation and creep as the rigidity of the ring core was increased from 20,000 MPa to 80,000 MPa and 210,000 MPa (see '20 000', '80 000' and '210 000', respectively, in FIG. 9B).

In some embodiments, the sealing ring may be resilient and may be formed, for instance and without limitation, of nylon, a polytetrafluoroethylene such as, for example, Teflon™, a polyimide-based polymer such as, for example, Vespel™, a polyether ether ketone such as, for example, PEEK™, a polychlorotrifluoroethylene such as, for example, Kel-F™ or hard rubber. The sealing ring may be formed of a material reinforced with fibres, such as polytetrafluoroethylene or Teflon™ reinforced with fibres.

In certain embodiments, the sealing ring described herein provides a ball valve characterized by greater strength, improved sealing, increased seat strength, more uniform torque, less fatigue, lower cold flow, decreased creep, high life cycle, or a combination thereof.

In the preceding description, for purposes of explanation, numerous details are set forth in order to provide a thorough understanding of the embodiments of the invention. However, it will be apparent to one skilled in the art that these specific details are not required in order to practice the invention. The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A ball valve sealing ring for sealing between a ball valve body and a ball valve member, the sealing ring comprising:
   a ring body having a valve member-contacting surface for contacting the ball valve member, an outer surface which is at least partially concave, and at least one valve body-contacting shoulder for contacting the valve body; and
   a resilient ring core fully enclosed within the ring body and being of greater resilience than the ring body, the resilient ring core for providing bending resistance and having an arcuate cross-section having a convex side and a concave side,
   wherein the convex side is situated between the concave side and the member-contacting surface along its length.

2. The ball valve sealing of claim 1, wherein the arcuate cross-section is an arc or a pointed arch.

3. The ball valve sealing ring of claim 2, wherein the arc is a circular arc, an ovoid arc, an elliptical arc, or a hyperbolic arc.

4. The ball valve sealing ring of claim 1, wherein the resilient ring core is formed from a Belleville washer.

5. The ball valve sealing ring of claim 1, wherein the valve member-contacting surface and the outer surface of the ring body are of substantially the same curvature as the convex surface and the concave surface of the resilient core, respectively.

6. The ball valve sealing ring of claim 1, wherein the sealing ring and/or the resilient ring core is at least partially conical.

7. The ball valve sealing ring of claim 1, wherein the resilient ring core defines a plurality of apertures spaced about its circumference, the ring body extending therethrough.

8. The ball valve sealing ring of claim 1, wherein the valve member-contacting surface is convex and/or comprises an apex for contacting the valve member.

9. The ball valve sealing ring of claim 8, wherein the apex comprises a point for contacting the valve member.

10. The ball valve sealing ring of claim 1, wherein the valve member-contacting surface comprises two pointed apexes flanking a substantially flat portion for contacting the ball valve member.

11. The ball valve sealing ring of claim 1 wherein the outer surface comprises a concave portion positioned between two substantially flat portions.

12. The ball valve sealing ring of claim 11, further comprising at least two valve-contacting shoulders disposed between the valve member-contacting surface and the outer surface.

13. The ball valve sealing ring of claim 12, wherein the arcuate cross-section is substantially U-shaped, having ends which are angled towards the valve member-contacting surface and which follow a contour defined by the outer surface and the two valve-contacting shoulders.

14. The ball valve sealing ring of claim 1, wherein the sealing ring comprises a plurality of resilient ring cores.

15. A ball valve seating arrangement comprising the sealing ring of claim 1, a ball valve member, and a ball valve body comprising a ring-accommodating groove.

16. The ball valve seating arrangement of claim 15, wherein the ball valve member bears against and elastically deflects the valve member-contacting surface of the sealing ring, the resilient ring core is deflected away from the ball valve member, and the resilient ring core is deflected less than the member-contacting surface of the sealing ring is deflected.

17. The ball valve seating arrangement of claim 15, wherein an apex of the convex side of the resilient ring core is positioned closest to the ball valve member.

18. A ball valve sealing ring for sealing between a ball valve body and a ball valve member, the sealing ring comprising:
    a ring body having a valve member-contacting surface for contacting the ball valve member, at least two valve body-contacting shoulders for contacting the valve body having an outer surface disposed therebetween; and
    a resilient ring core disposed within the ring body and being of greater resilience than the ring body, the resilient ring core for providing bending resistance and being substantially U-shaped, having ends angled towards the valve member-contacting surface and following a contour defined by the outer surface and the two valve-contacting shoulders.

19. A ball valve seating arrangement comprising the sealing ring of claim 18, a ball valve member, and a ball valve body comprising a ring-accommodating groove.

* * * * *